(12) United States Patent
Peso et al.

(10) Patent No.: US 12,130,535 B2
(45) Date of Patent: Oct. 29, 2024

(54) SUSPENDED PARTICLE DEVICES WITH IMPROVED ADHESION BETWEEN THE ACTIVE AND CONDUCTING LAYERS

(71) Applicant: GAUZY LTD., Tel Aviv (IL)

(72) Inventors: Eyal Peso, Tel Aviv (IL); Adrian Lofer, Tel Aviv (IL); Tania Fadida, Holon (IL); Dana Gal-Fuss, Tel Aviv (IL)

(73) Assignee: GAUZY LTD., Tel Aviv (IL)

( * ) Notice: Subject to any disclaimer, the term of this patent is extended or adjusted under 35 U.S.C. 154(b) by 486 days.

(21) Appl. No.: 17/623,548

(22) PCT Filed: Jul. 1, 2020

(86) PCT No.: PCT/IL2020/050730
§ 371 (c)(1),
(2) Date: Dec. 28, 2021

(87) PCT Pub. No.: WO2021/001823
PCT Pub. Date: Jan. 7, 2021

(65) Prior Publication Data
US 2022/0269141 A1 Aug. 25, 2022

Related U.S. Application Data

(60) Provisional application No. 62/869,597, filed on Jul. 2, 2019.

(51) Int. Cl.
*G02F 1/17* (2019.01)
*C09J 7/25* (2018.01)
(Continued)

(52) U.S. Cl.
CPC .............. *G02F 1/172* (2013.01); *C09J 7/255* (2018.01); *C09J 7/35* (2018.01); *H01B 1/08* (2013.01);
(Continued)

(58) Field of Classification Search
CPC .... G02F 1/172; C09J 7/255; C09J 7/35; C09J 2301/304; C09J 2467/00; C09J 2483/00;
(Continued)

(56) References Cited

U.S. PATENT DOCUMENTS 5,164,003 A 11/1992 Bosco et al.
6,271,956 B1 8/2001 Saxe et al.
(Continued)

FOREIGN PATENT DOCUMENTS

CN 101517451 A 8/2009
CN 109856884 A 6/2019
(Continued)

OTHER PUBLICATIONS

National Intellectual Property Administration, People's Republic of China, The First Office Action for Chinese Patent Application No. 2020800588356, issued May 12, 2023, 11pp.
(Continued)

*Primary Examiner* — Mohammed A Hasan
(74) *Attorney, Agent, or Firm* — The Roy Gross Law Firm, LLC; Roy Gross

(57) ABSTRACT

A suspended-particle device with improved adhesion between the active and conductive layers is disclosed. The conductive layers are coated with an adhesion promoter that comprises at least one organosilane that covalently bonds to the surface of the conductive layer and comprises a cross-linkable moiety such as an acrylate. The active layer comprises a suspension of active particles in a polymer matrix that comprises a polymer having pendant cross-linkable moieties such as acrylates. Upon curing (e.g. by irradiation by ultraviolet light), the polymer matrix of the active layer cross-links with the cross-linkable moieties of the adhesion promoter, thereby binding the active and conductive layers.

19 Claims, 2 Drawing Sheets

(51) Int. Cl.
*C09J 7/35* (2018.01)
*H01B 1/08* (2006.01)

(52) U.S. Cl.
CPC ...... *C09J 2301/304* (2020.08); *C09J 2467/00* (2013.01); *C09J 2483/00* (2013.01)

(58) Field of Classification Search
CPC ........ H01B 1/08; H01B 1/06; B32B 2250/24; B32B 2250/40; B32B 2255/10; B32B 2255/20; B32B 2255/24; B32B 2255/26; B32B 2255/28; B32B 2264/102; B32B 2264/1022; B32B 2307/202; B32B 2307/412; B32B 7/12; B32B 27/08; B32B 27/16; B32B 27/18; B32B 27/36
USPC ......................................................... 359/296
See application file for complete search history.

(56) References Cited

U.S. PATENT DOCUMENTS

| | | | |
|---|---|---|---|
| 6,517,746 B1 | 2/2003 | Saxe et al. | |
| 2003/0227663 A1* | 12/2003 | Agrawal | G02F 1/157 |
| | | | 359/265 |
| 2007/0008603 A1* | 1/2007 | Sotzing | C09K 9/02 |
| | | | 359/265 |
| 2007/0195401 A1 | 8/2007 | Slovak et al. | |
| 2009/0153944 A1 | 6/2009 | Saxe et al. | |
| 2012/0236393 A1 | 9/2012 | Slovak et al. | |
| 2013/0164466 A1 | 6/2013 | Khadilkar et al. | |
| 2013/0063802 A1 | 12/2013 | Varaprasad et al. | |
| 2014/0320950 A1* | 10/2014 | Saxe | G02F 1/13318 |
| | | | 359/296 |
| 2015/0315437 A1 | 11/2015 | Albaugh et al. | |
| 2018/0074377 A1 | 3/2018 | You et al. | |
| 2020/0055284 A1* | 2/2020 | Kizmaz | G02F 1/0102 |

FOREIGN PATENT DOCUMENTS

| | | |
|---|---|---|
| EP | 1056974 A1 | 12/2000 |
| JP | 2010237265 | 10/2010 |
| JP | 2010237265 A | 10/2010 |
| TW | 466359 B | 12/2001 |
| WO | 2008075772 A1 | 6/2008 |
| WO | WO2009156060 | 12/2009 |

OTHER PUBLICATIONS

European search report for EP20835646 dated Jul. 5, 2022.
PCT International Search Report for International Application No. PCT/IL2020/050730 dated Oct. 8, 2020, 3pp.
2 PCT Written Opinion for International Application No. PCT/IL2020/050730 dated Oct. 8, 2020, 6pp.
International Search Report for PCT/IL2020/050730 dated Jul. 1, 2021.

* cited by examiner

SUSPENDED PARTICLE DEVICES WITH IMPROVED ADHESION BETWEEN THE ACTIVE AND CONDUCTING LAYERS

REFERENCE TO RELATED PUBLICATION

This application is a national phase filing under 35 U.S.C. 371 of International (PCT) Pat. Appl. No. PCT/IL2020/050730, filed 1 Jul. 2020, and claims priority from U.S. Provisional Pat. Appl. No. 62/869,597, filed 2 Jul. 2019, both of which are incorporated by reference in their entirety.

FIELD OF THE INVENTION

This invention relates in general to Suspended Particle Devices (SPDs). It relates more specifically to SPDs with improved adhesion between the active and conducting layers and methods for manufacturing such devices.

BACKGROUND OF THE INVENTION

Suspended particle devices (SPDs) are devices for controlling the transmission of light. SPDs typically comprise an active layer that controls the transmission of light through the device disposed between two transparent substrates, typically constructed of a material such as polyethylene terephthalate (PET), each of which is coated with a transparent conductive layer, typically constructed from a material such as tin-doped indium oxide (ITO). The SPD is thus constructed in the general form of a capacitor.

The active layer comprises an emulsion of a continuous polymeric phase and a liquid polymer that is insoluble in the continuous polymeric phase. Particles or droplets containing particles that can reorient themselves in an external electric field are dispersed in the liquid polymer. In its normal (OFF) state, no electric potential is applied to the conducting layers, and the active particles are randomly oriented within the droplets or within the polymer matrix. In this state, the light absorption of device is maximized, with a transmittance in the visible range that is typically 1% or less. When an electric potential is applied to the conducting layers, an electric field is created within the active layer, and the particles align with the electric field, thereby increasing the transmittance through the device; typical SPDs have a maximum transmittance of ~50% in the visible range.

One parameter that has a major influence on the durability of the SPD is the adhesion between the active layer and the PET-ITO film substrate. Insufficient adhesion between the active layer and the conductive layer can lead to delamination, in some cases to the extent that even minor shear can completely destroy the SPD. As an additional example, it is well known in the art that SPDs are sensitive to humidity, and low adhesion can exacerbate this effect, lessening the durability and lifetime of the SPD under practical conditions.

The adhesion of the continuous polymeric phase to the conductive layer determines the overall adhesion of the active layer to the conductive layer. Since the polymer typically lacks any functional groups that can react with or interact with the surface of the conductive layer, the adhesion is thereby typically quite limited.

A number of attempts to solve this problem have been proposed. For example, U.S. Pat. Appl. Pub. No. 20120236393 discloses an SPD in which the conductive layer comprises a polythiophene-based conductive polymer such as polyethylene dioxythiophene. The inventors assert that these devices have stronger adhesion between the conductive and active layers than do SPDs that use inorganic materials such as ITO in the conductive layer. In contrast, U.S. Pat. Appl. Pub. No. 20070195401 discloses an SPD in which the particles in the active layer are suspended in a polymer matrix comprising at least one cross-linked siloxane polymer. The inventors assert in this case that the polymer matrix composition has better adhesion than compositions previously known in the art.

A different approach to improving the adhesion of the active and conductive layers has been to coat the conductive layer with material such as an adhesive to which the active and conductive layers bind more strongly than they do to each other. For example, U.S. Pat. No. 6,271,956 discloses the use of adhesives that are inherently tacky at room temperature, in particular, polyacrylate-based adhesives, to coat the conductive layer and thereby bind it to the active layer. U.S. Pat. Appl. Pub. No. 20090153944 discloses an SPD in which an overcoat comprising either $TiO_2$ or a combination of $SiO_x$ and an inorganic material having an index of refraction greater than 1.54 at 589 nm is applied to the conductive layer. U.S. Pat. Appl. Pub. No. 20180074377 discloses the use of an adhesive layer between the conductive and active layers in which the adhesive layer comprises functional nanoparticles.

A third general approach has been the use of silicone-based cross-linking agents that when cured provide covalent bonding between the active and conductive layers. For example, Japanese Pat. Pub. No. 2010237265 discloses an SPD in which an ITO conductive layer is coated with a solid silicone resin. The active layer comprises particles suspended in a polyacrylate matrix. Upon curing, the pendant acryloxy groups in the silicone resin cross-link with acrylate groups in the active layer matrix, thereby binding the active layer to the resin.

Despite these different attempts, an SPD with improved adhesion between the conductive and active layers remains a long-felt, yet unmet need.

SUMMARY OF THE INVENTION

The invention disclosed herein is designed to answer this need. An SPD is disclosed that comprises an adhesion promoter disposed between the conductive layer and the active layer. The adhesion promoter comprises molecules that are simultaneously covalently bound to the surface of the conductive layer and crosslinked with pendant groups of the polymer matrix of the active layer.

It is therefore one object of the invention disclosed herein to provide an SPD comprising: a first transparent outer layer (100) having an outer surface and an inner surface; a first conductive layer (150) having an outer side and an inner side disposed such that said outer side is disposed on said inner surface of said first transparent outer layer; a second transparent outer layer (100') having an outer surface and an inner surface; a second conductive layer (150') having an outer side and an inner side disposed such that said outer side is disposed on said inner surface of said second transparent outer layer; an active layer comprising a suspension of active particles in a polymer matrix and disposed between said first conductive layer and said second conductive layer, said polymer matrix comprising a polymer that comprises at least one pendant cross-linkable side chain; and, an adhesion promoter disposed upon at least one of said inner side of said first conductive layer and said inner side of said second conductive layer, said adhesion promoter comprising at least one cross-linkable moiety. It is within the essence of the invention wherein said adhesion promoter is covalently bound said surface upon which it is disposed; and, said adhesion promoter and said polymer matrix are cross-linked via said cross-linkable side chain and said cross-linkable moiety.

It is a further object of this invention to disclose such an SPD, wherein at least one of said transparent layers comprises PET.

It is a further object of this invention to disclose an SPD as defined in any of the above, wherein at least one of said conductive layers comprises ITO.

It is a further object of this invention to disclose an SPD as defined in any of the above, wherein said active particles comprise polyhalide light polarizing materials comprising a complex obtained by reacting elemental iodine; a hydrohalide acid or an ammonium halide, alkali metal halide or alkaline earth metal halide; a first compound comprising a pyrazine-2,5-dicarboxylic acid; and a second compound comprising a mono-alkyl ester or a mono-amide of a pyrazine-2,5-dicarboxylic acid.

It is a further object of this invention to disclose an SPD as defined in any of the above, wherein said active particles are the product of a process that comprises reacting in a suitable liquid elemental iodine; an inorganic halide; and a substantially rigid polycyclic precursor compound that has two cyclic structures linked together via an aromatic or heteroaromatic group, a three-dimensional structure that is defined by the two cyclic structures and has only one opening into the cavity, at least one polar group on the outside of the polycyclic precursor compound, and at least one chelating group for chelating hydrogen or metal ions inside the cavity.

It is a further object of this invention to disclose an SPD as defined in any of the above, wherein said adhesion promoter is an organosilane covalently bound to said inner surface of said conductive layer via Si—O linkages.

It is a further object of this invention to disclose an SPD as defined in any of the above, wherein said adhesion promoter is an organosilane characterized by a formula $Si(OR^1)_3R^2$, where $R^2$ is a cross-linkable organic functional group.

It is a further object of this invention to disclose an SPD as defined in any of the above, wherein said adhesion promoter is a polyorganosilane characterized by a formula $[(OR^1)_xR^2Si—O—SiR^2(OR^1)_x]_n$ in which each silicon atom is bound to at least one cross-linkable moiety $R^2$ and at least one $OR^1$ group, and in which successive silicon atoms are mutually bound to an oxygen atom.

It is a further object of this invention to disclose an SPD as defined in any of the above, wherein said cross-linkable moiety comprises at least one acrylate group.

It is a further object of this invention to disclose an SPD as defined in any of the above, wherein said cross-linkable side chain comprises at least one acrylate group.

It is a further object of this invention to disclose a method of producing an SPD, comprising: obtaining a first surface comprising a first transparent layer and a first conductive layer disposed on a side of said first transparent layer; obtaining a second surface comprising a second transparent layer and a second conductive layer disposed on a side of said first transparent layer; preparing a solution of an adhesion promoter comprising at least one cross-linkable moiety; applying said adhesion promoter to at least one of said first conductive layer and second conductive layer; condensing said adhesion promoter until it is at least partially covalently bound to an exposed surface of said layer to which it has been applied; placing an active layer comprising a suspension of active particles in a polymer matrix, said polymer matrix comprising at least one polymer comprising cross-linkable pendant groups, between said first conductive layer and said conductive layer; and, cross-linking said cross-linkable pendant groups and said cross-linkable moieties.

It is a further object of this invention to disclose such a method, wherein at least one of said first transparent layer and said second transparent layer comprises PET.

It is a further object of this invention to disclose the method as defined in any of the above, wherein at least one of said first conductive layer and second conductive layer comprises ITO.

It is a further object of this invention to disclose the method as defined in any of the above, wherein said adhesion promoter is an organosilane characterized by a formula $Si(OR^1)_3R^2$, where $R^2$ is a cross-linkable organic functional group.

It is a further object of this invention to disclose the method as defined in any of the above, wherein said adhesion promoter is a polyorganosilane characterized by a formula $[(OR^1)_xR^2Si—O—SiR^2(OR^1)_x]_n$ in which each silicon atom is bound to at least one cross-linkable moiety $R^2$ and at least one $OR^1$ group, and in which successive silicon atoms are mutually bound to an oxygen atom.

It is a further object of this invention to disclose the method as defined in any of the above, wherein said cross-linkable moiety is an acrylate.

It is a further object of this invention to disclose the method as defined in any of the above, wherein said step of applying said adhesion promoter comprises applying said adhesion promoter by a method selected from the group consisting of spraying and gravure coating.

It is a further object of this invention to disclose the method as defined in any of the above, wherein said step of condensing comprises heating said surface and said adhesion promoter until said adhesion promoter is at least partially covalently bound to said conducting layer.

It is a further object of this invention to disclose the method as defined in any of the above, wherein said cross-linkable pendant groups comprise acrylates.

It is a further object of this invention to disclose the method as defined in any of the above, wherein said step of curing comprises irradiating with ultraviolet light until said cross-linkable moieties and said cross-linkable pendant groups are at least partially cross-linked.

It is a further object of this invention to disclose the method as defined in any of the above, wherein said step of curing comprises curing until said cross-linkable moieties and said cross-linkable pendant groups are sufficiently cross-linked to provide an adhesion of said active layer and said conductive layer of at least 0.1 N/in.

It is a further object of this invention to disclose the method as defined in any of the above, wherein said step of curing comprises curing until said cross-linkable moieties and said cross-linkable pendant groups are sufficiently cross-linked to provide an adhesion of said active layer and said conductive layer of at least 0.2 N/in.

It is a further object of this invention to disclose the method as defined in any of the above, wherein said step of curing comprises curing until said cross-linkable moieties and said cross-linkable pendant groups are sufficiently cross-linked to provide an adhesion of said active layer and said conductive layer of between 0.1 and 0.3 N/in.

It is a further object of this invention to disclose the SPD as defined in any of the above, produced by the method as defined in any of the above.

BRIEF DESCRIPTION OF THE DRAWINGS

The invention will now be described with reference to the drawings, wherein.

DETAILED DESCRIPTION OF THE PREFERRED EMBODIMENTS

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims. In some cases, for clarity or conciseness, individual elements of the invention are discussed separately. Nonetheless, any combination of elements of the invention disclosed herein that is not self-contradictory is considered by the inventors to be within the scope of the invention.

As used herein, the abbreviation "SPD" stands for "Suspended Particle Device."

As used herein, the abbreviation "PET" stands for "polyethylene terephthalate."

As used herein, the abbreviation "ITO" stands for "tin-doped indium oxide."

As used herein, the term "active particle" refers to a particle of material that, when suspended in a suitable medium, will reorient itself upon application of an external electric field such that when a suspension of active particles in which the particles are randomly oriented in the absence of an external electric field is subjected to an external electric field, the particles tend to align with the electric field, thereby altering optical properties of the suspension such as the degree of transmittance of visible light. Active particles are typically rod- or needle-shaped. Non-limiting examples of active particles known in the art include metal oxides such as $TiO_2$ and $Fe_2O_3 \cdot H_2O$; metal salts such as $CoAl_2O_4$; alkali halides; and alkali oxides.

Unless otherwise indicated, with reference to numerical quantities, the term "about" is used to indicate a range of ±20% of the nominal value.

In the invention disclosed herein, a novel solution is provided for the problem of low adhesion between the conductive and active layers that limits the resilience and the lifetime of typical SPDs. The SPDs of the instant invention include an adhesion promoter between the conductive and active layers. The adhesion promoter is covalently bound to the surface of the conductive layer, and is cross-linked to the polymer that comprises the polymer matrix of the active layer. By being covalently bound to both layers, the adhesion promoter acts to bind chemically the conductive and active layers, which provides much stronger binding than the physical adhesion between the layers in SPDs known in the art.

Figure 1:
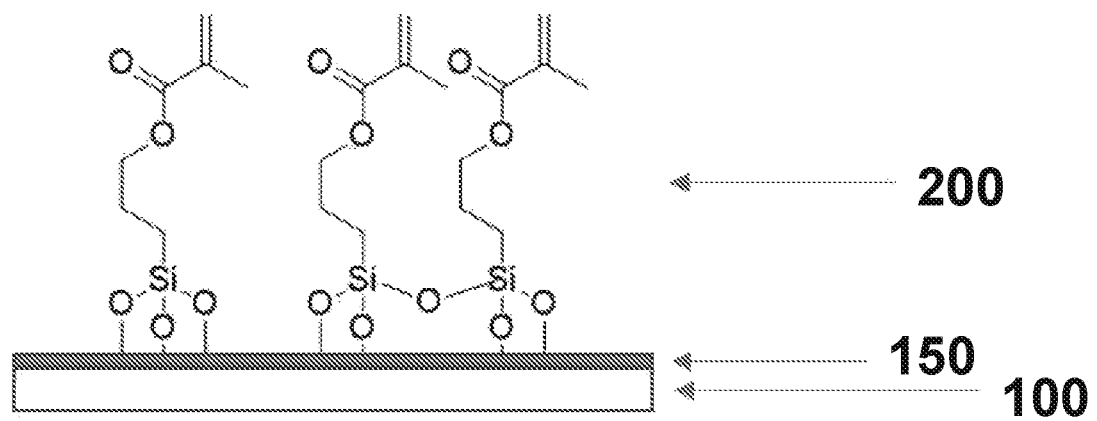
FIG. 1 depicts schematically the chemical structure of an adhesion enhancer that is covalently bound to the conducting layer of an SPD according to one non-limiting embodiment of the invention disclosed herein; and, FIG. 2 depicts schematically the crosslinking of pendant groups of an adhesion enhancer covalently bound to the conducing layer of an SPD to pendant groups of an active layer according to one non-limiting embodiment of the invention disclosed herein.

Reference is now made to FIG. 1, which illustrates schematically the binding of one non-limiting embodiment of an adhesion promoter to the conductive layer. Conductive layer 150 is disposed upon a transparent outer layer 100. In typical embodiments of the invention, the transparent outer layer is made of PET, and the conductive layer is made of ITO, but any substances known in the art that are suitable for use in preparation of an SPD may be used. An adhesion promoter 200 that comprises at least one cross-linkable functional group is covalently bound to the exposed surface of the conductive layer, leaving the cross-linkable functional group exposed. In some non-limiting embodiments of the invention such as the one shown in FIG. 1, the adhesion promoter is an organosilane having a general formula of $Si(OR^1)_3R^2$, where $R^1$ may by hydrogen or an organic functional group such as an alkyl group, and $R^2$ is the cross-linkable organic functional group. In some preferred embodiments of the invention, as shown in FIG. 1, the cross-linkable organic functional group is an acrylate. As shown in FIG. 1, adhesion promoters comprising polysilanes of the general formula $[(OR^1)_xR^2Si—O—SiR^2(OR^1)_x]_n$ in which the silicon atoms are joined via Si—O—Si linkages, are considered by the inventors to be within the scope of the invention. The adhesion promoter is chemically bound to the upper surface of the conductive layer. In cases in which the adhesion promoter is an organosilane and the conductive layer is an oxide such as ITO, the adhesion promoter is bound to the surface of the conductive layer by Si—O—[surface] linkages created by condensation of the organosilane and the surface of the oxide.

Figure 2:
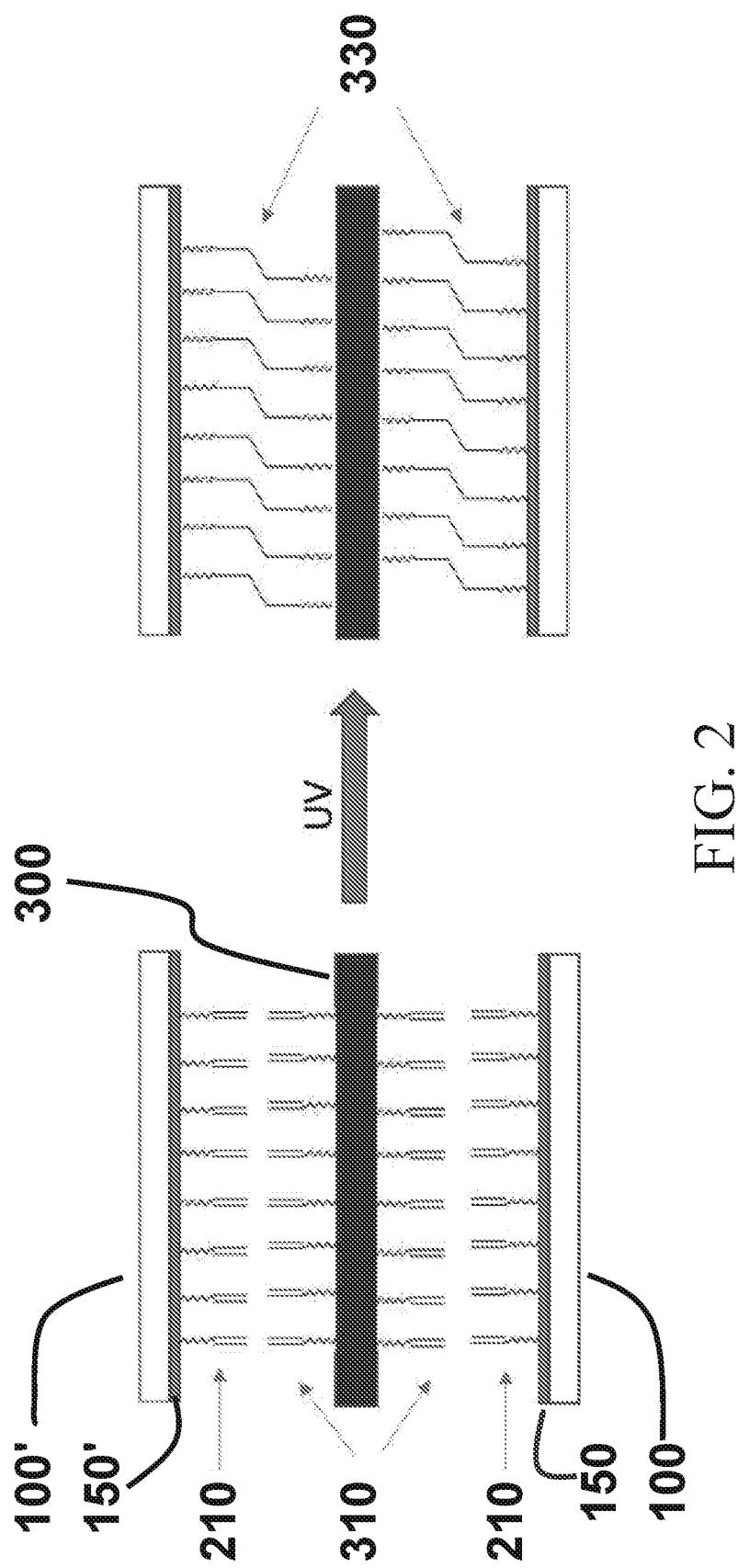

Reference is now made to FIG. 2, which illustrates schematically the binding of the active layer and conductive layer via the adhesion promoter. The SPD comprises two transparent layers 100 and 100', each of which has a conductive layer (150 and 150', respectively) disposed on its inner surface. The adhesion promoter is disposed on the inner surface of at least one of the conductive layers, preferably on both of them. The cross-linkable group R (210) of the adhesion promoter is shown schematically sticking out from the surface.

An active layer 300, comprising a suspension of active particles (or of droplets comprising active particles), is disposed between the two conductive layers. Any type of active particles known in the art may be used. In some preferred embodiments of the invention, the active particles comprise at least one of the polyhalide light polarizing materials disclosed in U.S. Pat. No. 6,517,746, which is hereby incorporated by reference in its entirety. In a non-limiting example of this embodiment, the active particle comprises a complex obtained by reacting elemental iodine; a hydrohalide acid or an ammonium halide, alkali metal halide or alkaline earth metal halide; a first compound comprising a pyrazine-2,5-dicarboxylic acid; and a second compound comprising a mono-alkyl ester or a mono-amide of a pyrazine-2,5-dicarboxylic acid. In some other preferred examples of the invention, the active particles comprise at least one of the polyhalide light polarizing materials disclosed in European Pat. No. 1,056,974, which is hereby incorporated by reference in its entirety. In a non-limiting example of this embodiment, the active particles are prepared by a process that comprises reacting in a suitable liquid elemental iodine; an inorganic halide; and a substantially rigid polycyclic precursor compound that has two cyclic structures linked together via an aromatic or heteroaromatic group, a three-dimensional structure that is defined by the two cyclic structures and has only one opening into the cavity, at least one polar group on the outside of the polycyclic precursor compound, and at least one chelating group for chelating hydrogen or metal ions inside the cavity.

The polymer matrix comprises a polymer that has pendant cross-linkable moieties (310) that are shown schematically as sticking out from the matrix. In typical embodiments of the invention, the pendant cross-linkable moieties likewise comprise acrylate groups.

After initial assembly of the SPD, reaction is initiated between the cross-linkable moieties of the adhesion promoter and those of the polymer matrix, cross-linking the pendant groups of the polymer matrix and the cross-linkable moieties of the adhesion promoter, thereby yielding an SPD in which the active layer and conductive layer are cross-linked (330).

In typical embodiments of the invention, the adhesion of the active layer and the conductive layer is at least 0.1 N/in. In preferred embodiments of the invention, the adhesion of the active layer between 0.1 and 0.3 N/in. In particularly preferred embodiments of the invention, the adhesion of the active layer is about 0.2 N/in.

The following example is intended to assist a person of ordinary skill in the art to make and use the invention disclosed herein, and are not in any way intended to be limiting.

EXAMPLE

A solution comprising an adhesion promoter was prepared by adding 4 g of 3-(trimethoxysilyl)propyl methacrylate to a bottle containing 200 ml of an ethanol/water mixture (approximately 95% ethanol) and mixing for 30 min using a magnetic stirrer.

PET-ITO (i.e. a PET film coated with a layer of ITO) was obtained, and the solution obtained in the previous step was applied to the upper surface of the ITO layer. The loading of the solution on the surface was approximately 30-40 g/m². The PET-ITO-silane was then heated to 110° C. until the silane and oxide surface condensed, releasing water and producing a cured PET-ITO-silane film in which the silane was bound to the ITO by Si—O— [surface] linkages.

An SPD was then constructed from two pieces of cured PET-ITO-silane film and an active layer comprising active particles suspended in a polyacrylate polymer by placing the active layer between the two cured PET-ITO-silane films and irradiating the assembly with UV light until the adhesion promoter and polymer matrix were cross-linked.

We claim:

1. A suspended-particle device (SPD), comprising: a first transparent outer layer having an outer surface and an inner surface; a first conductive layer having an outer side and an inner side disposed such that said outer side is disposed on said inner surface of said first transparent outer layer; a second transparent outer layer having an outer surface and an inner surface; a second conductive layer having an outer side and an inner side disposed such that said outer side is disposed on said inner surface of said second transparent outer layer; an active layer comprising a suspension of active particles in a polymer matrix and disposed between said first conductive layer and said second conductive layer, said polymer matrix comprising a polymer that comprises at least one pendant cross-linkable side chain; and, an adhesion promoter disposed upon at least one of said inner side of said first conductive layer and said inner side of said second conductive layer, said adhesion promoter comprising at least one cross-linkable moiety; wherein: said adhesion promoter is covalently bound said surface upon which it is disposed; and, said adhesion promoter and said polymer matrix are cross-linked via said cross-linkable side chain and said cross-linkable moiety.

2. The SPD according to claim 1, wherein at least one of said transparent layers comprises PET.

3. The SPD according to claim 1, wherein at least one of said conductive layers comprises ITO.

4. The SPD according to claim 1, wherein said active particles comprise polyhalide light polarizing materials comprising a complex obtained by reacting elemental iodine; a hydrohalide acid or an ammonium halide, alkali metal halide or alkaline earth metal halide; a first compound comprising a pyrazine-2,5-dicarboxylic acid; and a second compound comprising a mono-alkyl ester or a mono-amide of a pyrazine-2,5-dicarboxylic acid.

5. The SPD according to claim 1, wherein said active particles are the product of a process that comprises reacting in a suitable liquid elemental iodine; an inorganic halide; and a substantially rigid polycyclic precursor compound that has two cyclic structures linked together via an aromatic or heteroaromatic group, a three-dimensional structure that is defined by the two cyclic structures and has only one opening into the cavity, at least one polar group on the outside of the polycyclic precursor compound, and at least one chelating group for chelating hydrogen or metal ions inside the cavity.

6. The SPD according to claim 1, wherein said adhesion promoter is an organosilane covalently bound to said inner surface of said conductive layer via Si—O linkages.

7. The SPD according to claim 1, wherein said adhesion promoter is an organosilane selected from the group consisting of:
organosilanes characterized by a formula $Si(OR^1)_3R^2$, where $R^2$ is a cross-linkable organic functional group; and,
polyorganosilanes characterized by a formula $[(OR^1)_x R^2Si\text{—}O\text{—}SiR^2(OR^1)_x]_n$ in which each silicon atom is bound to at least one cross-linkable moiety $R^2$ and at least one $OR^1$ group, and in which successive silicon atoms are mutually bound to an oxygen atom.

8. The SPD according to claim 1, wherein said cross-linkable moiety comprises at least one acrylate group.

9. The SPD according to claim 1, wherein said cross-linkable side chain comprises at least one acrylate group.

10. A method of producing an SPD, comprising:
obtaining a first surface comprising a first transparent layer and a first conductive layer disposed on a side of said first transparent layer;
obtaining a second surface comprising a second transparent layer and a second conductive layer disposed on a side of said first transparent layer;
preparing a solution of an adhesion promoter comprising at least one cross-linkable moiety;
applying said adhesion promoter to at least one of said first conductive layer and said second conductive layer;
condensing said adhesion promoter until it is at least partially covalently bound to an exposed surface of said layer to which it has been applied;
placing an active layer comprising a suspension of active particles in a polymer matrix, said polymer matrix comprising at least one polymer comprising cross-linkable pendant groups, between said first conductive layer and said conductive layer; and, cross-linking said cross-linkable pendant groups and said cross-linkable moieties.

11. The method according to claim 10, wherein at least one of said first transparent layer and said second transparent layer comprises PET.

12. The method according to claim 10, wherein at least one of said first conductive layer and second conductive layer comprises ITO.

13. The method according to claim 10, wherein said adhesion promoter is an organosilane selected from the group consisting of:
organosilanes characterized by a formula $Si(OR^1)_3R^2$, where $R^2$ is a cross-linkable organic functional group; and,
polyorganosilanes characterized by a formula $[(OR^1)_x R^2Si-O-SiR^2(OR^1)_x]_n$, in which each silicon atom is bound to at least one cross-linkable moiety $R^2$ and at least one $OR^1$ group, and in which successive silicon atoms are mutually bound to an oxygen atom.

14. The method according to claim 10, wherein said cross-linkable moiety is an acrylate.

15. The method according to claim 10, wherein said step of applying said adhesion promoter comprises applying said adhesion promoter by a method selected from the group consisting of spraying and gravure coating.

16. The method according to claim 10, wherein said step of condensing comprises heating said surface and said adhesion promoter until said adhesion promoter is at least partially covalently bound to said conducting layer.

17. The method according to claim 10, wherein said cross-linkable pendant groups comprise acrylates.

18. The method according to claim 10, wherein said step of curing comprises curing until said cross-linkable moieties and said cross-linkable pendant groups are sufficiently cross-linked to provide an adhesion of said active layer and said conductive layer of at least 0.1 N/in.

19. The method according to claim 10, wherein said step of curing comprises curing until said cross-linkable moieties and said cross-linkable pendant groups are sufficiently cross-linked to provide an adhesion of said active layer and said conductive layer of between 0.1 and 0.3 N/in.

* * * * *